United States Patent [19]

Lundberg et al.

[11] Patent Number: 4,692,268

[45] Date of Patent: Sep. 8, 1987

[54] METHOD FOR CONTROLLING VISCOSITY OF ORGANIC LIQUIDS AND COMPOSITIONS

[75] Inventors: Robert D. Lundberg, Bridgewater; Robert R. Phillips, Spring Lake Heights; L. Sherwood Minckler, Watchung; David Y. Chung, Edison, all of N.J.

[73] Assignee: Exxon Research and Engineering Company, Florham Park, N.J.

[21] Appl. No.: 814,403

[22] Filed: Dec. 30, 1985

[51] Int. Cl.$^4$ ................ C10M 149/00; C10M 155/00
[52] U.S. Cl. ...................................... 252/33.4; 44/62; 252/50; 252/51
[58] Field of Search ................ 252/33, 33.4, 50, 51; 44/62

[56] References Cited

U.S. PATENT DOCUMENTS

| | | | |
|---|---|---|---|
| 4,144,181 | 3/1979 | Elliott et al. | 252/33.4 |
| 4,146,489 | 3/1979 | Stambaugh et al. | 252/50 |
| 4,340,689 | 7/1982 | Joffrion | 252/51.5 A |
| 4,516,982 | 5/1985 | Duvdevani et al. | 44/62 |
| 4,517,104 | 5/1985 | Block et al. | 252/33 |

Primary Examiner—Jacqueline V. Howard
Attorney, Agent, or Firm—Richard E. Nanfeldt

[57] ABSTRACT

A method for controlling the viscosity of organic liquids, said organic liquid having a solubility parameter of from about 6 to about 10.5, which comprises incorporating in said organic liquid a minor amount of a polymer complex, said complex being formed from the interaction of polymer A, containing neutralized sulfonate groups and polymer B, containing basic nitrogen groups, both functional groups being presented at a level of from about 4 to 500 meq. per 100 g. of polymer, wherein the polymeric backbone of polymer A and polymer B are the same.

12 Claims, No Drawings

_4,692,268_

METHOD FOR CONTROLLING VISCOSITY OF ORGANIC LIQUIDS AND COMPOSITIONS

FIELD OF THE INVENTION

The instant invention relates to a process for controlling the viscosity of organic liquids by incorporating in said liquid a minor amount of two interacting polymers. One of the polymers is an ionic polymer which comprises a backbone which is substantially soluble in said organic liquid, and pendant ionic groups which are substantially insoluble in said organic liquid. The other polymer which contains the same backbone as the ionic polymer contains basic nitrogen atoms such as amine groups which interact with the counterion of the ionic group of the ionic polymer to form a complex. A cosolvent is selected which will optionally solubilize the pendant ionic groups and provide a reasonably homogeneous mixture of solvent, cosolvent and polymer. The preferred compositions prepared by the method of the instant invention comprises in organic liquid having a solubility parameter of from 6 to 10.5 in combination with a sulfonated polymer containing from 0.2 up to 10.0 mole % ionic groups which has been neutralized by a transition metal of the Periodic Table of the Elements, wherein the sulfonated polymer is complexed with another polymer having the same polymeric backbone as the sulfonated polymer and containing basic nitrogen atoms such as an amine-containing polymer and optionally, a cosolvent such as a nonvolatile alcohol or amine.

BACKGROUND OF THE PRIOR ART

The rapid decrease in viscosity of liquids with increasing temperature is well-known. Ideally, for many applications (automobile lubricants, etc.) it would be desirable to solve this problem so that viscosity would be insensitive to temperature. Alternatively, it might be desirable to provide liquid systems whose viscosities actually increase with temperature. It is true that with selected polymeric additives, it has been possible to reduce substantially the viscosity change with temperature which does occur with most oils and similar systems. These polymer additives, known as viscosity-index improvers (or V.I. Improvers) are generally high molecular weight polymers.

The way in which these additives function can be summarized very briefly. In effect, they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however, at elevated temperatures the polymer is more highly solvated such that the polymer expands and is a relatively more effective thickner.

While these V.I. Improvers have proven successfully commercially, it is important to note that their effect at reducing viscosity changes with temperatures is rather mild. For a typical base oil containing a suitable V.I. Improver, the kinematic viscosity will still decrease by a factor of from 5 to 10 as the temperature increases from 30° to 100° C. Obviously, if it is desired to hold the viscosity roughly constant with such temperature changes. Current technology has not offered an appropriate additive system to solve this problem.

U.S. Pat. No. 3,396,136 describes how copolymers of alkenyl aromatic sulfonic acid, when properly neutralized, can be employed as thickeners for nonpolar solvents. Those metal sulfonate systems have been shown to be very effective; however, when employed as two component systems (i.e., ionic polymer plus nonpolar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent, i.e., a solvent for the sulfonate groups about equal in amount to the amount of sulfonate groups which are present. This amount of polar cosolvent is not within the limits of the instant invention, which only optionally requires amounts of the cosolvent (which interacts with the ionomeric groups of the ionomer copolymer) at levels which range from 10 to 600 times the molar equivalence of ionic groups. This level of cosolvent is about one to two orders of magnitude or more higher than employed in the cited art. In addition, the cited patent is restricted to aromatic sulfonate polymers. The instant invention describes other polymers such as sulfonated ethylene propylene terpolymers, which are a portion of the polymer complex.

U.S. Pat. No. 3,366,430 teaches the gelling of organic liquids by the interaction of polar "associative bonds" which includes hydrogen bonding and "ionic cross-linking". Again, this patent specifies that two components are necessary—the associating polymer (or polymers in some cases) and the nonpolar organic liquid. There is no mention of a third polar cosolvent except to point out that such polar liquids should not be present. Specifically, this patent states (Column 2, line 7) that the hydrocarbon liquids to which this invention is to be applied should not contain a substantial portion of a miscible protolytic liquid such as methanol. It is clear that the language of this patent limits this invention to gels and further, that any amount of polar liquids which are present to an extent where they disrupt those gels are undesirable. The instant invention is distinct from that cited in that amounts of such polar compounds, as will break up gel at ambient conditions, are required and in fact the most preferred state is free of any said gel at ambient conditions, are required and in fact that most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxacrylic esters, sulfonic acids, etc. It is emphasied in this patent (Column 3, line 72) that it is critical that in the preparation of such polymers, no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions—and is directed towards amine or ammonium derivatives. Only metallic counterions are effective in the instant invention—and that, in fact, attempts to employ amine derivatives have not resulted in the results which are the objectives of this invention. Finally, this cited patent does describe (Column 7, lines 13–19) that the addition of alcohols will reduce the viscosity of the thickened hydrocarbon and alter flow characteristics thereof.

U.S. Pat. Nos. 3,931,021 and 4,118,361 describe the use of ionic polymers and required co-solvents in an organic liquid and V.I. Improvers. The instant invention represents an improvement over U.S. Pat. Nos. 3,931,021 and 4,118,361, and therefore provides a new dimension in viscosity control of hydrocarbon-based solvents. Specifically, it has been discovered that these complexes offer a different viscosity-temperature relationship than do the sulfonate ionomers previously disclosed. Furthermore, the types of ionic polymers previously described as viscosifiers for oils and low polarity diluents usually are effective thickeners at modest levels, but if one attempts to make a concentrate (10% polymer by weight) the resulting solution is too viscous to handle. The solutions described in this invention can have relatively low viscosities at high concentrations of polymer, yet maintain relatively high viscosities at low polymer concentrations. This change in the viscosity-concentration relationship is a fundamental discovery of potentially great practical relevance. Typically, solutions of ionomers display high viscosities at polymer concentrations near 1% or above, and at lower polymer concentrations display abnormally low viscosities. Consequently, such solutions are not efficient viscosifiers at polymer concentrations which are attractive from an economic viewpoint. At the same time concentrated solutions of such ionic polymers possess undesirably high viscosities precluding preparation of polymer concentrates from a practical standpoint. Currently such solutions display very steep viscosity-concentration profiles such that a modest change in polymer concentration results in a dramatic change of viscosity. In any practical application this behavior is extremely undesirable for a very slight change in concentration produces an impractical change in viscosity.

The instant invention describes a modification in the viscosity concentration profiles of ionomer solutions which moderates the change in viscosity with concentration such that this "knife-edge" characteristics is no longer manifested to the same degree. Furthermore, it is a consequence of this modification that high polymer concentrations can be prepared of such solutions with substantially lower viscosity; yet when these solutions are diluted, viscosities at low polymer concentrations are substantially higher than those of the corresponding ionomer. This desirable characteristic leads to very effective thickening behavior. A further consequence of this invention is that the resulting solutions will exhibit extremely good shear stabilities as compared to extremely high weight convention polymer solutions.

The present invention relates to the formation of water insoluble complexes of a metal sulfonated EPDM which is interacted with an EPDM containing a basic amine group. Typically, the basic amine displaying appropriate interaction will be a tertiary, secondary or primary amino group which has been grafted or otherwise reacted with various functional groups attached to the EPDM polymer molecule. One example of such an animated EPDM is that of a vinyl pyridine grafted to either an ethylene-propylene copolymer or an EPDM. Alternately under some conditions such polymers conceivably could be prepared via copolymerization routes; however, this route has generally been ineffective with conventional catalysts.

Solution of the polymer complex of a metal sulfonated EPDM with the aminated EPDM's provide very effective viscosification in a hydrocarbon diluent. For example, a polymer complex of a zinc sulfonated EPDM with vinyl pyridine grafted EP exhibits a marked decrease in dependence of viscosity on polymer concentration as compared to a sulfonated EPDM terpolymer. This behavior demonstrates a unique degree of thickening efficiency. The mechanism for this viscosification is believed to arise from an intermolecular association resulting from a coordination of the amine group with the zinc sulfonate group. This promotes an extremely effective temporary network which is very effective at viscosification. At high concentration the solution viscosity of the complex is actually less than that of the sulfonated EPDM, while at low concentration the viscosity curves are reserved. This is, in part, a consequence of ionic plasticization at high concentrations.

The resulting polymer complexes of the instant invention display a degree of isoviscous behavior with temperature as compared with either component by itself. The isoviscous behavior of these systems can be further enhanced by the addition of polar cosolvents to give viscosities which can actually increase as temperature is increased.

The instant invention is to be contrasted with the inventions described in U.S. application Ser. Nos. 547,911 and 547,908 and related copending cases which describe polymer complexes based on different polymer backbones (i.e., sulfo EPDM and styrene-vinyl pyridine). Unlike those systems, this invention is based on complexing polymers with a common backbone.

The products of those prior patent applications were based on polymers which posessed dissimilar backbones. The formation of those complexes permitted the dissolution of certain polymers normally not miscible in a solvent (or oil) through the formation of a complex. However, it was observed under some conditions when such polymer complexes were sufficiently dilute that insufficient complexing would occur and therefore one of the polymer components could (and did) phase separate. The instant invention circumvents that problem in that the polymer backbone is common to both complexing polymers. Therefore, these complexes remain soluble over all polymer concentrations and form solutions in appropriate solvents which are thermodynamically more favored. Thus, we can derive the improved thickening efficiency, shear stability, and improved VI behavior with temperature that occurs as a consequence of the complexing groups.

SUMMARY OF THE INVENTION

A method for controlling the viscosity of organic liquids, said organic liquid having a solubility parameter of from about 6 to about 10.5, which comprises incorporating in said organic liquid a minor amount of a polymer complex, said complex being comprised of polymer A, containing neutralized sulfonate groups and polymer B, containing basic nitrogen groups, both functional groups being presented at a level of from about 4 to 500 meq. per 100 g. of polymer, wherein the polymeric backbones of polymer A and polymer B are the same.

GENERAL DESCRIPTION OF THE INVENTION

It has been discovered that the viscosity of organic liquids may be conveniently controlled by incorporating in said organic liquid a minor amount of a polymer complex which is the reaction product of a sulfonated polymer and a polymer having the same polymeric backbone as the sulfonated polymer and containing low levels of nitrogen atoms. The polymer complex is characterized as having polymer backbones which are substantially soluble in the organic liquid, and pendant sulfonate groups which are substantially insoluble in the organic liquid.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation, the polymer can be considered to be prepared from a hypothetical monomer having an average molecular weight, which is the average of the two monomer components. Similarly for terpolymers, the same averaging concepts apply; however, three components are involved. For example, ethylene-propylene-ethylidene norbornene (ENB) is a preferred polymer backbone for this invention. A representative terpolymer would have a composition (weight percent) of 50% ethylene, 45% proplene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milliequivalents of sulfonic acid groups per 100 gms of polymer or meq. per 100 g. of polymer. This latter procedure provides a rapid and independent measure of sulfonic acid content in a polymer through simple titration. Both mole percent sulfonate and milliequivalent of sulfonate will be employed to describe the sulfonate polymers employed in this invention.

In general, the sulfonated polymer will comprise from about 4 meq. up to 100 meq. of sulfonate groups per 100 g. of polymer, more preferably about 10 meq. to about 50 meq. of pendant sulfonate grups per 100 g. of polymer The sulfonated polymers of the instant invention may vary in number average molecular weight as measured by GPC from 10,000 to 200,000, preferably 15,000 to 100,000, most preferably from 20,000 to 60,000. These polymers may be prepared by methods known in the art; for example, see U.S. Pat. No. 3,642,728, hereby incorporated by reference.

Neutralization of the cited sulfonated polymers with appropriate metal hydroxides, metal acetates, metaloxide, etc. can be conducted by means well-known in the art. For example, the sulfonation process as with EPDM terppolymers containing a small 0.3 to 1.0 mole % unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected. The degree of neutralization of said ionomeric groups may vary from 50 to 500 mole %, preferably 90 to 200%. Most preferably, it is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those materials of Group I and Group IIA, which include Li, Na, K etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with an EPDM terpolymer/vinyl pyridine copolymer than does a magnesium or sodium neutralized system. It is for this reason that the transition elements are preferred with zinc, copper, iron, nickel and cobalt being especially preferred. We also include antimony and lead as suitable cations.

EP copolymers are formed by interpolymerization of monomers of ethylene and one or more higher monoolefins having from 3 to 16 carbon atoms, preferably propylene. EPDM terpolymers are formed of the same ethylene, one or more higher mono-olefins as described above, plus one or more polyenes. The polyene monomers may be selected from the group consisting of branched chain monomers, straight or branched chain polyene or cyclic polyenes containing 4 to 20 carbon atoms and preferably 5 to 10 carbon atoms and two carbon bon to carbon double bonds. The preferred straight chain polyene is 1,4-hexadiene but other straight chain dienes can be used, such as discussed in U.S. Pat. No. 3,884,993.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons or halogenated bridged ring hydrocarbons are preferred. Examples of such bridged ring hydrocarbons include the polyunsaturated derivatives of bicyclo (2,2,1) heptane wherein at least one double-bond is present in one of the bridged rings, such as dicyclopentadiene, bichclo(2,2,1)hepta-2,5-diene, the alkylidene norbornenes, and especially the 5-alkylidene-2-norbornes, wherein the alkylidene group contains 1–20 carbon atoms and preferably 1–8 carbon atoms, the alkenyl norbornenes, and especially the 5-alkenyl-2-norbornenes, wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(2,2,2) octa-2,5-diene, polyunsaturated derivatives of bicyclo(3,2,1) octane, polyunsaturated derivatives of bicyclo(3,3,3) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbonene, 5-isopropylidene-2-norbornene, 5-n-butylidene-2-norbornene, 5-isobutylidene-2-norbornene, dicyclopentadenes, the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The copolymer or terpolymer may contain chemically bound therein molar ratios of ethylene to propylene varying between 95:10 ethylene to 5:90 propylene, and preferably between 70:30 ethylene to 55:45 propylene. The polyene or substituted polyene may be chemically bound therein to replace the ethylene or propylene in an amount of 0.1 to 10 mole percent, and preferably 0.3 to 1 mole percent, or in an amount to provide an actual unsaturation level of 2 double bonds per 1,000 carbon atoms in the polymer chain to unsaturation level as high as 100 double bonds per 1,000 carbon atoms in the polymer.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended in the backbone and a diene in the side chain. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g., 50 wt. % and about 2.6 to about 8.0 wt. % diene monomer, e.g., 50 wt. %. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2 norbornene, 5-propenyl-2-norbornene, and methal tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. %. The $\overline{M}n$ as measured by GPC of Vistalon 2504-20 is about 26,00, the $\overline{M}v$ as measured by GPC is about 90,000 and the $\overline{M}w$ as measured by GPC is about 125,000.

Nordel 1320 (DuPont) is another terpolymer having a Mooney viscosity at 212° F. of about 25 and having about 53 wt. % of ethylene, about 2.5 wt. % of 1,4-hexadiene, and about 43.5 wt. % of propylene.

The EPDM terpolymers of this invention have a number average molecular weight ($\overline{M}n$) as measured by GPC of about 10,000 to about 200,000, more preferably about 15,000 to about 100,000, most preferably of about 20,000 to about 60,000. The Mooney viscosity (ML, 1+8, 212° F.) of the EPDM terpolymer is about 1 to about 60, more preferably about 5 to about 50, most preferably about 5 to about 40. The $\overline{M}v$ as measured by GPC of the EPDM terpolymer is preferably below about 350,000 and more preferably below about 300,000. The $\overline{M}w$ is measured by GPC of the EPDM terpolymer is preferably below about 500,000 and more preferably below about 350,000.

The preparation of EP copolymers and EPDM terpolymers is well known and is fully described in such patents as U.S. Pat. Nos. 2,933,480; 3,093,621; 3,211,709; 3,646,168; 3,790,519; 3,884,993; 3,894,999; 4,059,654, amongst many others.

The sulfonated EP copolymers or EPDM terpolymers of the instant invention are formed by dissolving the EP copolymer or EPDM terpolymer in a nonreactive solvent such as chlorinated aliphatic solvent, chlorinated aromatic hydrocarbon, an aromatic hydrocarbon, or an aliphatic hydrocarbon, such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is added to the solution of the polymer and nonreactive solvent at a temperature of about −100° C. to about 100° C. for a period of time of about 1 to about 60 minutes, more preferably at room temperature for about 5 to about 45 minutes; and most preferably about 15 to about 30. Typical sulfonating agents are described in U.S. Pats. Nos. 3,642,728 and 3,836,511, previously incorporated herein by reference. These sulfonating agents are selected from an acyl sulfate, a mixture of sulfuric trioxide donor and a Lewis base containing oxygen, sulfur, or phosphorous. Typical Lewis based are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyrylsulfate. The acyl sulfate can be formed in situ in the reaction medium or pregenerated before its addition to the reaction medium in a chlorinated aliphatic or aromatic hydrocarbon. Subsequent to the sulfonation process the unsulfonated EP copolymer or EPDM terpolymer is neutralized with the aforementioned transition metal.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated co or ter polymer has about 10 to about 200 meq. unneutralized sulfonate groups per 100 grams of sulfonated polymer, more preferably about 15 to about 100; and most preferably about 20 to about 80. The meq. of unneutralized sulfonate groups per 100 grams of polymer is determined by both titration of the polymeric sulfonic acid and dietert Sulfur analysis. In the titration of the sulfonic acid, the polymer is dissolved in solvent consisting of 95 parts of toluene and 5 parts of methanol at a concentration level of 50 grams per liter of solvent. The unneutralized form is titrated with ethanolic sodium hydroxide to an Alizarin-Thymolphthalein endpoint.

The unneutralized sulfonated polymer is gel free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness. Hydrolytically stable means that the acid function, in this case the sulfonic acid, will not be eliminated under neutral or slightly basic conditions to a neutral moiety which is incapable of being converted to highly ionic functionality.

The amine containing copolymers of the instant invention are formed by grafting vinyl pyridine onto an EP copolymer or an EPDM terpolymer by the procedure as set forth in U.S. Pat. No. 4,340,689 which is incorporated herein by reference. The EP or EPDM polymeric backbones of the amine polymers of the instant invention are the same as those previously described for the sulfonated polymers of the instant invention.

The amine content in the amine polymer is expressed in terms of basic nitrogen. In this respect, the nitrogen content in amides and similar nonbasic nitrogen functionality is not part of the interacting species. For example, the amount of vinyl pyridine in the amine-containing polymer can vary widely, but should range from less than 50 weight percent down to at least 0.5 weight percent. A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred. For oil solubility lower levels of amine groups are most desirable, from about 4 meq. to about 50 meq. of basic nitrogen is most preferred.

It is important that the EP and EPDM hydrocarbon polymer backbones (in the absence of the sulfonate groups and the vinyl pryridine) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook, edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymer which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline. The preferred ionic EPDM terpolymers for use in the instant invention are prepared by sulfonation of an EPDM-containing ethylidene norbornene units.

The sulfonated polymers of the instant invention may be neutralized prior to incorporation into the organic solvent, or by neutralization of the acid form in situ. For example, preferably the acid derivative is neutralized immediately after preparation. For example, if the sulfonation of the EPDM terpolymer is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The basic nitrogen-containing polymer which is selected from the group consisting of vinyl pyridine/EP copolymers and vinyl pyridine/EPDM terpolymers which are formed by grafting the vinyl pyridine onto the EP copolymer or EPDM terpolymer as described in U.S. Pat. No. 4,340,689.

The polymer complex of the sulfonated polymer and the basic nitrogen-containing polymer can be formed by forming a first solution of the sulfonated polymer in an organic liquid and a second solution of the basic nitrogen-containing polymer in the organic liquid, wherein the organic liquid which has a solubility parameter of less than 9.5 and a viscosity of less than about 35 centipoises and is selected from the group consisting of mineral oil, synthetic oil, lubricating oils, alkanes, cycloalkanes and aromatics and mixtures thereof. Alternately both components of the complex can be simultaneously dissolved in the same solvent systems at the desired concentrations. The concentration of the sulfonated polymer in the first solution is about 0.05 to about 10 grams per 100 ml of organic liquid, more preferably about 0.1 to about 5. The concentration of the basic nitrogen-containing (amine) polymer in the second solution is about 0.05 to about 10 grams per 100 ml of the organic liquid, more preferably about 0.1 to about 5, and most preferably about 0.1 to about 2. The two solutions of the sulfonated polymer and the basic nitrogen-containing polymer are mixed together to form the polymer complex, wherein either the sulfonated polymer or the basic nitrogen-containing polymer such as styrene-vinyl pyridine copolymer can be substantially in excess of the other.

A consequent of this concept is that if such solutions are diluted with non-reactive (less interactive) solvent, such as mineral oil or similar low polarity diluents, the result will be a dimunition of the one component with a relative increase in complex viscosity. Thus, unlike normal polymer solutions which drop off dramatically upon dilution, these solutions may decrease less in their solution viscosity. Such hydrocarbon or oil solutions have not been available previously. The concentration of the polymer complex in the organic liquid is about 0.05 to about 20 grams per 100 ml, more preferably about 0.1 to about 10, and most preferably about 0.2 to about 10.

The method of the instant invention includes optionally incorporating a cosolvent, for example, a polar cosolvent, into the mixture of organic liquid and polymer complex, to solubilize the pendant sulfonate groups. The polar cosolvent will have a solubility parameter of at least 10.0, more preferably at least 11.0, and may comprise from 0.1 to 40, preferably 0.5 to 20 weight percent of the total mixture of organic liquid, polymer complex, and polar cosolvent.

In addition to the requirements for the polymer copolymer, organic liquid and polar cosolvent, there is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_p$, then we require that:

$$S_p = S_L + 1.0$$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent. The polar cosolvent must be present in amounts of from 10 to 600 moles per mole of ionic group in order to give the desirable results of the instant invention and preferably from 20 to 400 moles per mole of ionic group. Preferred cosolvents are selected from the group consisting of amines and alpethatic alcohols having about 1 to about 10 carbon atoms.

DESCRIPTION OF THE PREFERRED EMBODIMENTS

The following are preferred embodiments of the instant invention.

EXAMPLE 1

Preparation of Ethylene Propylene (EP) Containing Tertiary Amine Groups

An ethylene propylene copolymer which is substantially non-crystalline is reacted with maleic anhydride in the presence of a free radical catalyst and a low level of maleic anhydride is thereby grafted on the EP backbone. The resulting modified EP is dissolved in oil or the reaction is conducted in oil and a polyamine is reacted with the anhydride functionality. The amine preferably has one primary amine units and one or more secondary or tertiary amine units. A preferred species is N-aminopropyl morpholine or (NAPM) as shown below:

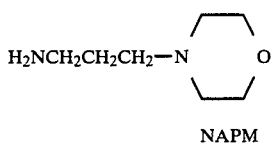

NAPM

This agent reacts with succinic anhydride groups to form an imide and a pendant tertiary amine:

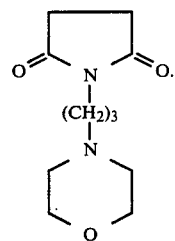

This amine can now complex with metal sulfonate ionomers, such as zinc sulfonate (EPDM).

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated TP 398. The resulting polymer was available as a free-flowing crumb and employed in that form as a blending component in the following examples.

EXAMPLE 3

Preparation of Aminated EP

Two samples of aminated EP were prepared by free radical grafting of vinyl pyridine on a non-crystalline ethylene copolymer by techniques well known in the art. The resulting polymers contain 0.23 and 0.31 weight percent nitrogen after completion of those reactions. This corresponds to approximately 16.4 meq. of basic nitrogen per 100 grams polymer (meq./100 gm) and 22.4 meq./100 gm respectively.

EXAMPLE 4

Comparison of the Solution Viscosities in xylene of Sulfonated EPDM, Aminated EP and Their Blend Complexes as a Function of Temperature and Concentration Solutions of sulfonated EPDM, aminated EP or the polymer blend complex of the sulfonated EPDM and aminated EP are prepared by charging the required amounts of polymer to a flask, adding xylene in sufficient quantity to produce the desired concentration and stirring at room temperature until a homogeneous solution is obtained. This generally requires from 2 to 24 hours, depending on the concentration required.

Xylene solutions were prepared in this manner of sulfo-EPDM, Zn salt, 10 meg.; EPVP-1 and EPVP-2 of Example 3; and blend complexes at concentrations indicated in Table I. Viscosities were obtained for each solution with the Brookfield Viscometer at the temperatures noted.

The viscosity data of Table I shows the comparison of solution viscosity as a function of temperature and concentration for the sulfo-EPDM, the aminated EP polymers and the blend complexes.

TABLE I

VISCOSITY-CONCENTRATION PROFILES AT VARIOUS TEMPERATURES OF ZINC SULFO-EPDM, EP-VINYL PYRIDINE GRAFTS, AND BLENDS IN XYLENE

| Example 4 | Sulfo-EPDM % | EPVP # | EPVP % | Viscosity, Centipoise | | | | | |
|---|---|---|---|---|---|---|---|---|---|
| | | | | 0° C. | 25° C. | 50° C. | 75° C. | 100° C. | 125° C. |
| A | — | 1 | 2 | 18 | 11 | 7.6 | 5.5 | 4.14 | — |
| B | — | 2 | 2 | 28 | 13.7 | 9.4 | 6.84 | 5.1 | — |
| C | 3 | — | — | 400,000+ | 66,400 | 3,330 | 780 | 220 | 76 |
| D | 3 | 1 | 3 | 34,000 | 9,280 | 3,975 | 2,815 | 1,405 | 415 |
| E | 3 | 2 | 3 | 27,100 | 8,230 | 4,190 | 2,910 | 1,463 | 464 |
| F | 2 | — | — | — | 5,930 | 250 | 60 | 20 | 9 |
| G | 2 | 1 | 2 | — | 2,485 | 919 | 480 | 211 | 73 |
| H | 2 | 2 | 2 | — | 1,740 | 682 | 394 | 188 | 63 |
| I | 1 | — | — | 7.94 | 4.8 | 3.32 | 2.14 | 1.60 | — |
| J | 1 | 1 | 1 | 122 | 41 | 18 | 10.3 | 6.5 | 4.24 |
| K | 1 | 2 | 1 | 103 | 38.5 | 18.4 | 11 | 7 | 4.3 |
| L | 0.5 | — | — | — | 1.42 | — | — | — | — |
| M | 0.5 | 1 | 0.5 | — | 3.9 | — | — | — | — |
| N | 0.5 | 2 | 0.5 | — | 4.1 | — | — | — | — |

EXAMPLE 5

Comparing Solution Viscosity As A Function Of Blend Ratio, Concentration And Temperature Of Sulfonated Epdm, Ethylene Propylene Polymer Containing Tertiary Amine Groups And Blends In 100 N Oil An ethylene propylene succinic anhydride N-aminopropylmorpholine product prepared as described in Example 1 was blended in oil with zinc sulfo-EPDM, 10 meg, at weight percent ratios and concentrations as noted in Table II. Viscosities with a Brookfield viscometer were obtained of each blend solution, as well as solutions of the sulfo-EPDM and EPSA-NAPM alone in 100 N oil.

The viscosity data as summarized in Table II show the comparison of solution viscosity as a function of blend ratio, concentration and temperature.

EXAMPLE 6

Comparing Solution Viscosity At 25° C. As A Function Of Blend Ratio For Blends Of Sulfo-Epdm And Ethylene Succinic Anhydride N-Propyl Morpholine In 100 Neutral Oil An ethylene propylene succinic anhydride N-morpholine product prepared as described in Example 1 was blended in 100 Neutral oil with sulfo-EPDM, zinc salt, 10 meg. at weight percent ratios as indicated in Table III. The total solids content was maintained at 3%. Viscosities of each solution were obtained with a Brookfield viscometer at 25° C. and are shown in Table III.

TABLE II

BLENDS OF ZINC-SULFO EPDM AND ETHYLENE-PROPYLENE SUCCINIC ANHYDRIDE N—AMINOPROPYL MORPHOLINE IN 100 N OIL VISCOSITY VS. BLEND RATIO, CONCENTRATION AND TEMPERATURE

| Example 5- | Weight % Ratio EPSA-NAPM/SULFO-EPDM | Total Concentration % | Viscosity, Centipose | | | | | |
|---|---|---|---|---|---|---|---|---|
| | | | 0 | 25 | 50 | 75 | 100 | 125 |
| A-1 | 100/0 | 5 | 22,000 | 3,700 | 1,010 | 380 | 170 | 98 |
| A-2 | 100/0 | 2.5 | 3,100 | 580 | 175 | 72 | 41 | 27 |
| A-3 | 100/0 | 1 | 475 | 105 | 35 | 16 | 8.7 | 5.7 |
| B-1 | 4/1 | 5 | 223,600 | 23,000 | 3,900 | 990 | 418 | 200 |
| B-2 | 4/1 | 2.5 | 9,000 | 1,400 | 349 | 130 | 61 | 35 |
| B-3 | 4/1 | 1 | 650 | 140 | 45 | 19 | 10 | 6.6 |
| C-1 | 2/1 | 5 | 472,000 | 32,000 | 4,900 | 1,240 | 480 | 240 |
| C-2 | 2/1 | 2.5 | 14,700 | 1,900 | 455 | 152 | 68 | 36 |
| C-3 | 2/1 | 1 | 680 | 149 | 48 | 21 | 11 | 6.8 |
| C-1 | 1/1 | 5 | 2,000,000+ | 110,000 | 13,000 | 3,500 | 1,250 | 590 |
| D-2 | 1/1 | 2.5 | 50,000 | 3,800 | 675 | 205 | 87 | 45 |
| D-3 | 1/1 | 1 | 820 | 170 | 53 | 22 | 11.6 | 7.4 |
| E-1 | 0/100 | 2 | 17,100 | 1,714 | 365 | 137 | 67 | 37 |
| E-2 | 0/100 | 1 | 775 | 155 | 51 | 25 | 13.5 | 8.5 |
| E-3 | 0/100 | 0.5 | 290 | 66 | 24 | 11.3 | 6.5 | 4.3 |
| E-4 | 0/100 | 0.25 | 200 | 47 | 17.5 | 8.8 | 5.4 | 3.8 |
| F | 0/0 (100 N oil) | — | 146 | 35 | 12.8 | 6.4 | 3.8 | 2.6 |

TABLE III

BLENDS OF ZINC SULFO-EPDM AND ETHYLENE-PROPYLENE SUCCINIC ANHYDRIDE N—AMINOPROPYL MORPHOLINE IN 100 N OIL. VISCOSITY AT 25° C. VS. BLEND RATIO AT CONSTANT 3% TOTAL CONCENTRATION

| Example | Weight % Ratio SULFO-EPDM/ EPSA-NAPM | Total Concentration % | Viscosity, Centipoise at 25° C. |
|---|---|---|---|
| A | 100/0 | 3 | 6,650 |
| B | 90/10 | 3 | 9,490 |
| C | 85/15 | 3 | 11,180 |
| D | 80/20 | 3 | 11,740 |
| E | 70/30 | 3 | 7,930 |
| F | 60/40 | 3 | 5,320 |
| G | 50/50 | 3 | 3,000 |
| H | 40/60 | 3 | 1,900 |
| I | 30/70 | 3 | 1,160 |
| J | 20/80 | 3 | 710 |
| K | 0/100 | 3 | 430 |

What is claimed is:

1. A hydrocarbon solution containing a polymer complex, said complex being present at a level of 0.05 to 20 weight percent of said solution, said polymer complex being a complex of: a metal sulfonated ethylene propylene terpolymer having a sulfonate content of 4 to 100 milliequivalents per 100 grams and a metal cation selected from the group consisting of zinc and transition elements, and an ethylene propylene copolymer or terpolymer having pendant basic amine groups, said pendant basic groups ranging from about 4 meg. to about 100 meg. wherein the ratio of the polymer containing the metal cation to the polymer containing basic amine groups being about 10 to about 0.1, wherein said ethylene propylene copolymers are grafted with maleic anhydride and subsequently reacted with N-aminopropyl morpholine on

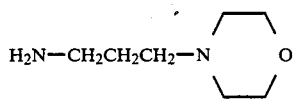

thereby forming

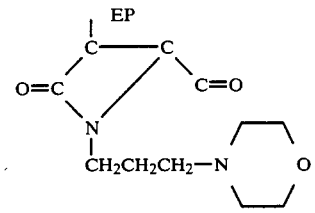

2. A solution according to claim 1, wherein said metal sulfonated terpolymer is a zinc sulfo-EPDM terpolymer.

3. A method for controlling the viscosity of organic liquids, said organic liquid having a solubility parameter of from about 6 to about 10.5, which comprises incorporating in said organic liquid a minor amount of a polymer complex, said complex being formed from the interaction of polymer A, containing neutralized sulfonate groups and polymer B, containing basic nitrogen groups, both functional groups being presented at a level of from about 4 to 500 meq. per 100 g. of polymer, wherein the polymeric backbone of polymer A and polymer B are the same.

4. The method of claim 3, further including a polar cosolvent, wherein said polar cosolvent comprises from about 0.1 to 40 weight percent of the total mixture of organic liquid, polymer complex and polar cosolvent.

5. The method of claims 3 or 4, wherein said polymer complex has from about 0.1 to about 10 mole percent pendant sulfonate groups.

6. The method of claims 3 or 4, wherein said polymer complex is a reaction product of a sulfonated EPDM terpolymer and a copolymer of vinyl pyridine with an EP copolymer or an EPDM terpolymer.

7. The method of claim 5, wherein said sulfonate groups are neutralized with basic compounds selected from groups of transition elements.

8. The method of claims 3 or 4, wherein said polymer complex is incorporated into said organic liquid at a level of from 0.05 to 20 grams/100 ml.

9. The method of claims 3 or 4, wherein said organic liquid has a viscosity at 100° F. of less than 35 centipoises.

10. The method of claims 3 or 4, wherien said organic liquid is a lubricating oil.

11. The method of claims 3 or 4, wherein said sulfonated polymer is in excess of said basic nitrogen-containing polymer.

12. The method of claims 3 or 4, wherein said basic nitrogen-containing polymer is in excess of said sulfonated polymer.

* * * * *